United States Patent [19]

Olsson

[11] 3,742,136

[45] June 26, 1973

[54] PICTURE GENERATING UNIT OF THE SCANNING TYPE

[75] Inventor: Tore Bertil Reinhold Olsson, Karlskoga, Sweden

[73] Assignee: Aktiebolaget Bofors, Bofors, Sweden

[22] Filed: Mar. 15, 1971

[21] Appl. No.: 124,209

[30] Foreign Application Priority Data

Mar. 26, 1970 Sweden .............................. 4274/70

[52] U.S. Cl. ......... 178/6.8, 178/DIG. 6, 178/DIG. 8, 178/DIG. 36

[51] Int. Cl. ........ H03k 5/20, H04n 5/22, H04n 7/18

[58] Field of Search ................ 178/DIG. 8, DIG. 37, 178/6.8, DIG. 36

[56] References Cited

UNITED STATES PATENTS

| | | | |
|---|---|---|---|
| 3,579,249 | 5/1971 | Dewey et al. | 178/DIG. 37 |
| 3,597,534 | 8/1971 | Lidingo | 178/DIG. 8 |
| 3,581,109 | 5/1971 | Olsson et al. | 178/DIG. 8 |
| 3,591,713 | 7/1971 | Olsson et al. | 178/DIG. 8 |

*Primary Examiner*—Howard W. Britton
*Attorney*—Hane, Baxley & Spiecens

[57] ABSTRACT

A scanning device such as an IR camera generates horizontal and vertical scanning signals to direct a detector over a viewing field. The detector then emits information signals in accordance with the amplitude of a property, such as temperature, at points within the viewing field. The scanning and information signals are fed to a display device to give a visual indication of the temperature distribution of the viewing field. In addition a selective device through the agency of the scanning signals controllably selects a portion of the viewing field for detailed study. The selective device feeds signals to the display device to visually demarcate the selected area and also selects the information signals in that area for amplitude measurement. The measure of the amplitude is converted to a form suitable for visual display so that there is simultaneously displayed a representation of the field of view with the selected area demarcated and an indication of the temperature within the selected area.

12 Claims, 7 Drawing Figures

SIGNAL PROCESSING UNIT 5 AND INDICATING UNIT 6

SIGNAL PROCESSING UNIT 5 AND INDICATING UNIT 6

PICTURE GENERATING UNIT OF THE SCANNING TYPE

The present invention relates to a picture generating unit of scanning type, which uses a first signal (video signal) which varies with the intensity of the radiation from the individual points in a scanned field of view, and in which unit additional signals give information about the scanning position or give indications of points in the scanning process. As an example of points in the scanning process can be mentioned those in which trigger signals to vertical and horizontal sweeps are obtained in certain types of picture generating units, and as an example of a picture generating unit of the type to which reference is here made can be mentioned IR cameras in which the conversion of the radiation into a video signal takes place in a single element or multi-element detector and in which information about the scanning position can also be obtained from the voltages which deflect the ray modified by the video signal or the rays in the picture tube synchronously with the scanning. Also TV camera systems fall under the above-mentioned definition.

With said picture generating units, and particularly the IR camera, there is often a pronounced desire to be able, in a simple way, to accurately measure the intensity of the radiation in the various points in the scanned field of view. It has been proposed to determine the radiant intensity on the basis of the grey picture obtained on the display part of the picture generating unit which, however, has proved to be a very inexact and time-consuming method which, for instance, is definitely not appropriate for an untrained operator.

It has also been proposed to introduce so-called isotherms in or alternatingly with the picture. These are then based upon the video signal, and amplify the intensity of the ray in the picture tube when the video signal is within a certain amplitude range, the position and size of which can be varied with graduated knobs. If, with this system, it is desired to obtain a measure of the intensity of the radiation at a certain point, the amplitude position knob is turned from a reference position until the isotherm covers the point in question, after which with the aid of the position of the knob, the radiant intensity can be determined. This latter method is acceptable to a certain extent if the intensity of the radiation from the point is constant, but if, on the other hand, the intensity changes in time, which is a common measuring case, particularly when measurements are made with the IR camera, this is a complicated procedure.

The present invention solves the above-mentioned problem by creating a unit wherein the radiant intensity in an arbitrary point in the field of view can be read out directly and its construction and function also permits that the readout can easily be made by an entirely untrained operator, without losing any of the reading accuracy. According to the invention the picture generating unit is substantially characterized in that it contains a selective device for scanning said additional signals, which is arranged to reproduce the first signal (the video signal) in at least one area located in the field of view, in that the selective device is connected to a signal-processing unit where the first signal which reproduced said area will be processed so that it can be presentable in an indicating unit coacting with said signal-processing unit and the selective device, and in that the selective device is also connected to a device in the picture generating unit, which presents a picture of the scanned field of view, in such a way that it causes an indication in or at the picture which shows where in the field of view said area is located.

Embodiments proposed at present which have the characteristics which are significant for the invention will be described in the following, with reference to the attached drawings, in which.

Figure 1:
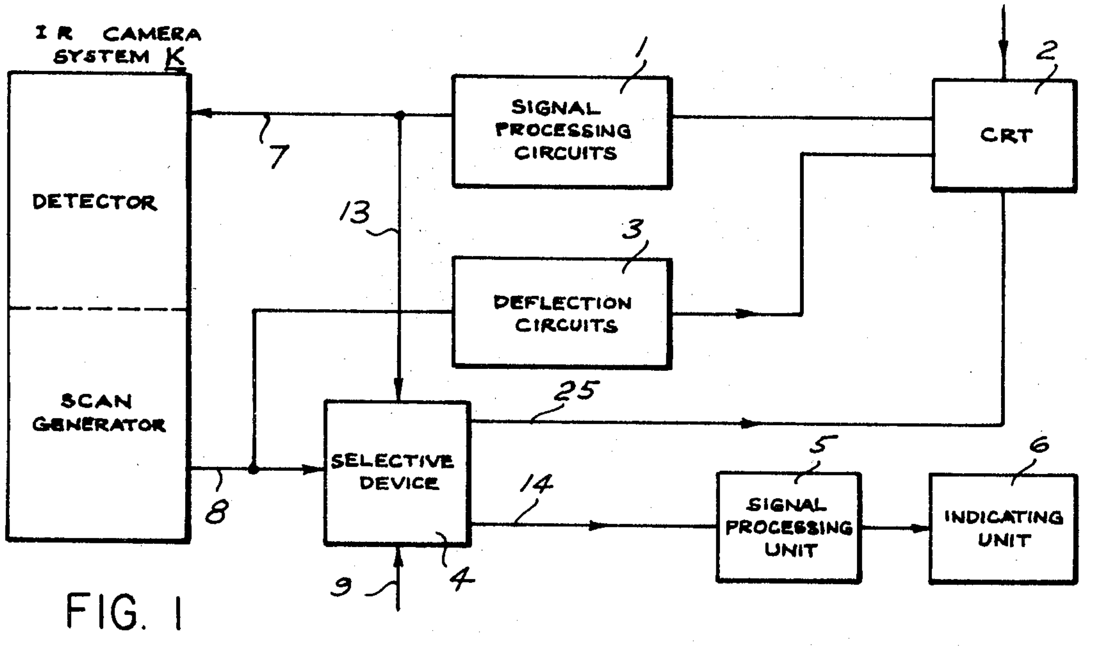
FIG. 1 shows a main basic diagram of the circuits in the picture generating unit which coact with a device according to the invention.

In FIG. 1, K is an IR camera system and 1 indicates signal-processing circuits of the kind normally comprised in the video channel of the picture generating unit. These signal-processing circuits contain setting members of known kinds such as threshold and limit circuits for setting of the light intensity and black level and the range in the grey scale in a picture obtained in a picture display part 2 such as a cathode ray tube system. Said elements K,1,2 and 3 are well known and can be similar to those shown in FIG. 3, page 3 of "A Wide Angle Infra-Red Camera for Industry."-Industrial Electronics November, 1968 picture display part 2 is also connected to conventional deflection circuits 3 which transmit signals for deflection of the ray in the picture tube of the display part 2. Said parts 1, 2 and 3 coact with a selective device 4, a signal-processing unit 5 and an indicating unit 6, hereinafter more fully described. At a point 7, a video signal from a detector in the IR camera system K is received by the signal-processing circuits 1, while at point 8, information is obtained about the situation in a scanning undertaken by the scan generator of IR camera system K, which information is received by the deflection circuits 3, as well as by the selective part 4. Moreover, at a point 9 in or at the selective part, a selection of the situation takes place, and determination of the size of an area in the field of view, and since it is of interest to be able to indicate the selected area in or at the picture, the selective part 4 is connected to the picture display part 2 where the signals for indication in the picture can for instance be fed in directly on an intensity-controlling grid of the picture tube or at an appropriate place in the signal processing circuits 1. Further, the selective part is connected to the video signal channel in such a way that it can reproduce the video signal within the area selected in the field of view, for instance by scanning, representation and/or separation, the reproduced part of the video signal then being processed in the signal-processing unit 5 so that, for instance, the mean and/or peak value of the video signal within the area is obtained. The part of the video signal that has been measured within the area and processed in the unit 5 is indicated analogously or digitally on the indicating unit 6.

Figure 2:
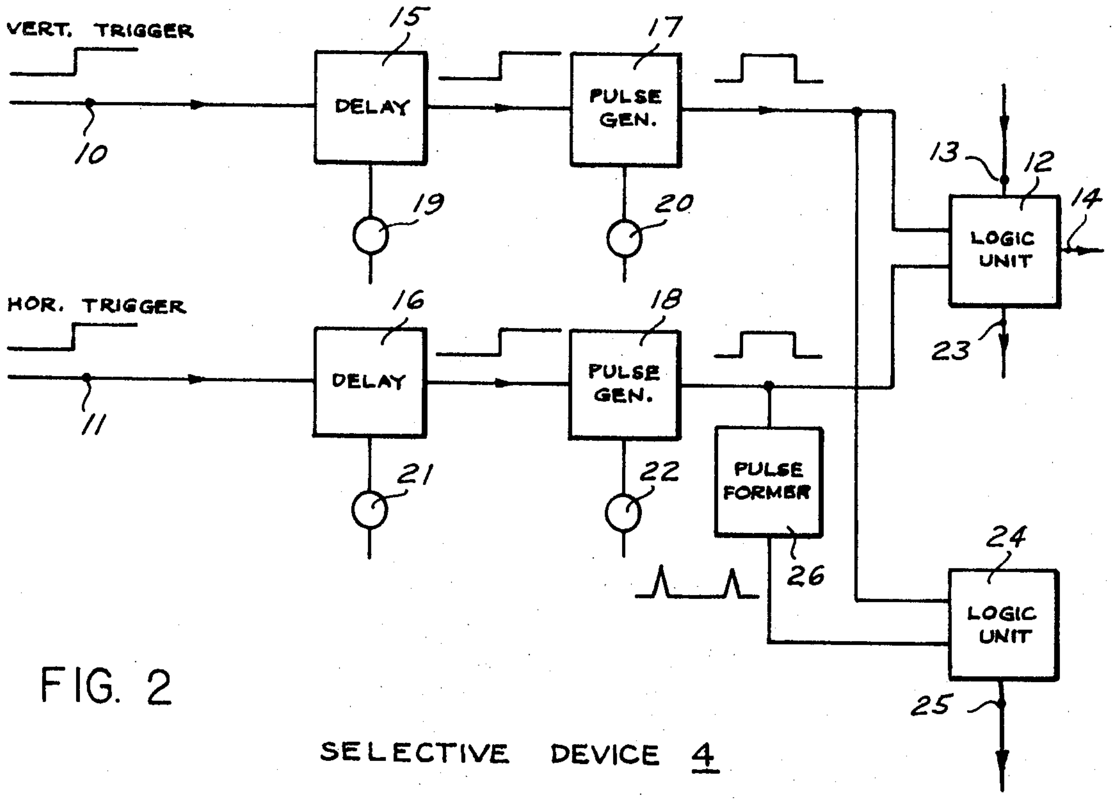
FIG. 2 shows schematically a first embodiment of a selective device.

In FIG. 2, which shows an embodiment of the selective device in more detail, additional signals are received in the form of so-called vertical and horizontal trigger signals via lines 10 and 11, respectively, from the scan generator IR camera system K,. The selective device contains a logic part 12, through which it can be connected to an appropriate place in the video channel via 13 and to the signal-processing unit (5 in FIG. 1) via line 14. The selective device also contains two branches, each of which contains a delay circuit (delay multivibrator) 15 and 16, respectively, and a pulse generator (one shot multivibrator) 17 and 18, respectively. In one of the branches, which via line 10 scans trigger signals obtained at or which control the vertical scanning in the scanning parts of the picture generating unit, a trigger signal of current interest is delayed in the delay circuit 15 for a time determined by means of a knob 19 which can be actuated manually to vary the time constant of the multivibrator. The delayed trigger signal thereafter initiates the pulse generator 17 which, in turn, transmits a pulse of a certain duration, which pulse is finally fed into the logic part 12. By means of a knob 20 which can be actuated to vary the time constant of the circuit, the duration of said pulse can also be varied. Thus, by means of the knob 19 it is possible to determine in the logic part 12 where in the field of view the lower edge of an area should start in relation to the lower edge of the field of view, while the height the area should have in the field of view can be selected with the knob 20.

In the other branch, which via line 11 scans trigger signals which are obtained at or which control the horizontal scanning in the scanning parts of the picture generating unit, in the corresponding way, a trigger signal of current interest is delayed in the delay circuit 16 for a time determined by means of a knob 21 which can be actuated manually. The trigger signal thereby delayed initiates the pulse generator 18 to transmit a pulse, the length of which is determined by means of a knob 22, and which is thereafter fed into the logic part 12. It is thereby determined by means of the knob 21 in the logic part 12 where in the field of view, usually counted from its left-hand edge, the area should start, while the knob 22 determines the lateral extent of the area. Elements 16 and 18 are similar to above-described elements 15 and 17, respectively.

It will thus be obvious that by means of a suitable design of the logic part (using coincidence circuits), it is possible to indicate an area, the size and position of which in the field of view is determined by the knobs in question. The logic part is then arranged in a known way so that the video signal is reproduced during the time one is within the area, i.e. as long as pulses are being received from both branches simultaneously, whereby it is possible to obtain information for determining the voltage present within the area from the logic part, as well as information about the size of the area, for instance via a connection point 23, to which the signal-processing member can be connected in certain embodiments of the signal-processing unit and the indicating unit (5 and 6 in FIG. 1). With certain limitations of the possibilities of selecting the configuration of the area, the functions of the knobs 19 and 20 can be combined in a first control member, and the same applies to the knobs 22 and 21, which can be combined in a second control member.

In the example of the embodiment, the selective device also contains an additional logic part 24 (using coincidence circuits), which is connected both to the pulse generator 17 and the pulse generator 18 for scanning of the pulses transmitted from the generators. The additional logic part has an output 25 for connection to the intensity controlling grid on the picture tube in the display part (2 in FIG. 1), which provides for indication of the area in the picture. In the example of the embodiment according to FIG. 2, the additional logic part 24 is connected to the pulse generator 18 via a circuit of a known type which contains a differentiator and a phase shifter. Because of the circuit 26, the area will be indicated on the picture tube through an increase in intensity at the two vertical edges of the area.

Figures 3, 4:
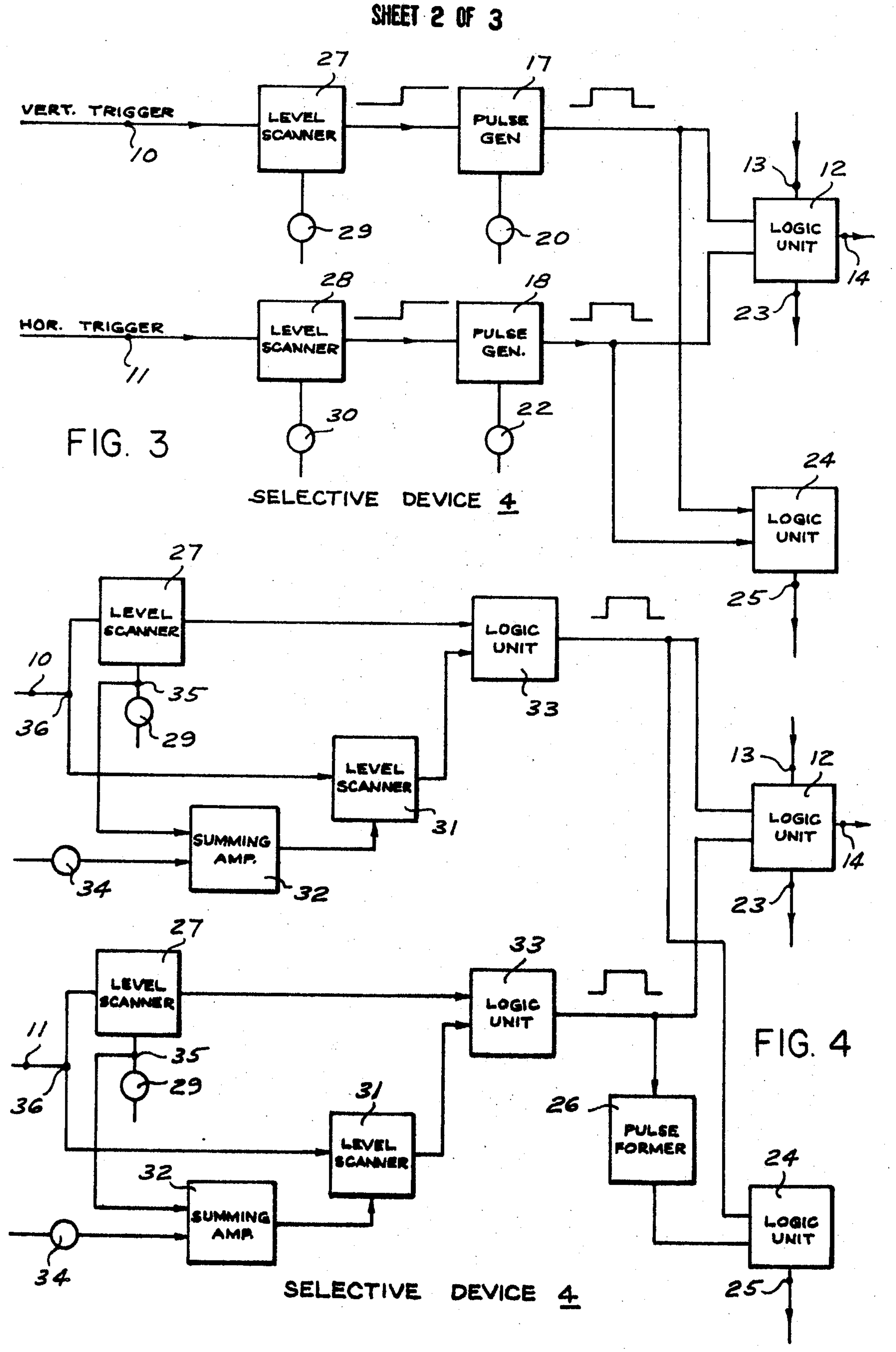
FIG. 3 shows schematically a second embodiment of the selective device.
FIG. 4 shows schematically a third embodiment of the selective device.

In FIG. 3, which shows a second embodiment of the selective device 4, the additional signals received via lines 10 and 11 consist of vertical and horizontal sweep voltages in the picture generating unit. The delay circuits 15 and 16 have now been replaced by level scanning members 27 and 28 (such as threshold amplifiers or Schmitt-triggers), which can be actuated manually by means of knobs 29 and 30 for setting of comparison levels, with which the level scanning members are activated so that they transmit signals to the pulse generators 17 and 18. In the same way as above, when said signals are received, the pulse generators 17 and 18 are initiated so that they transmit pulses, the duration of which is determined by means of the knobs 20 and 22, which pulses are fed into the logic part 12. For the rest, the two embodiments correspond to each other except in that the circuit 26 is omitted in this latter embodiment, which involves that the light intensity will be increased within the entire area in the picture.

When determining the extent of the area vertically and horizontally, it is not necessary to use only pulse generators, of which FIG. 4 is intended to give an example. Compared with the embodiment according to FIG. 3, in each branch the pulse generator can be considered to be replaced by a further level scanning member 31, a summing amplifier 32 and a logic unit 33 a coincidence circuit). Also in this case the additional signals consist of vertical and horizontal sweep voltages in the picture generating unit via lines 10 and 11, respectively, and since the two branches are practically identical, only one of them will be described here, viz. the one that receives information about the scanning situation vertically via line 10.

The determination in the logic part 12 as to where in the field of view the area should start, counted from the upper or lower edge, is performed, as previously, with the knob 29, which controls a first comparison level for which the level scanning member is to transmit a signal. The extent of the area vertically is determined with a knob 34, which determines a voltage which in the summing amplifier 32 is added to the level which is determined by the knob 29. The sum signal is fed to the additional level scanning member 31, and determines the comparison level at which the level scanning member 31, which is connected to the sweep signal of current interest in point 36, is to transmit a signal. A signal is thus obtained from the level scanning member 27 in the lower edge of the area and from the additional level scanning member 31 at the upper edge of the area. These two signals are introduced in the logic unit 33

(coincidence circuits), which transmits a signal when scanning takes place vertically within the selected area. The extent of the area horizontally is determined in the corresponding way in the other branch, and the logic unit 12 then functions in the same way as described above.

Embodiments of the selective device other than those shown in FIGS. 2–4, as well as combinations of these can also be used. Thus, for instance, the device can be made with counters, in which the vertical position of the area is determined by a number of adjustable lines, for instance from the lower edge of the field of view, and the height of the area by determining the number of lines within the area. The embodiments shown moreover refer only to square or linear areas, but the concept of the invention is not limited to this. Thus, the area can also have other cinfigurations, such as a spot, a triangle or combinations of these and those previously mentioned.

Figure 5:
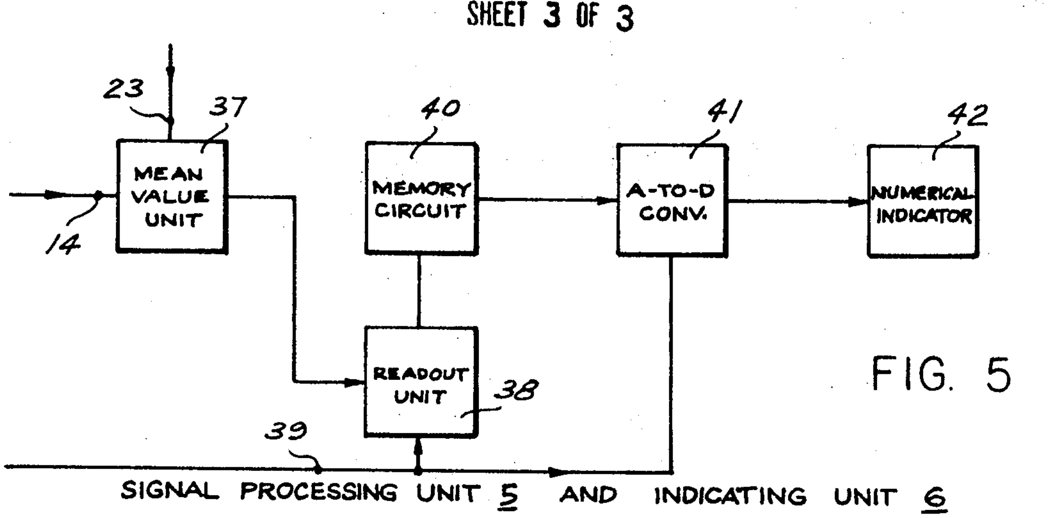
FIG. 5 shows schematically an embodiment of a signal-processing unit and an indicating unit with digital presentation.

FIG. 5 shows an embodiment of the signal-processing unit built together with the indicating unit (5 and 6 in FIG. 1). A mean value unit (an integrator) for the voltage of the video signal within the selected area, designated 37 and connected to the logic part (12 in FIGS. 2–4) via lines 14 and 23 is connected with a readout unit 38 which can be actuated with a readout signal. The readout signal can come from a member which is automatic or can be actuated by the operator via 39. The readout unit, in turn, is in contact with a memory circuit 40, to which an analogue to digital converter 41 is connected. Said converter contains a device 42 which indicates the result in figures. At the means value formation, it is necessary that the mean value unit receives information about the size of the area, i.e. the time for scanning the area, which takes place via 23 (see also FIGS. 2–4). The value obtained in the mean value unit is read out via the readout unit 38 and can be stored in the memory circuit 40 until a new readout takes place. The mean value unit (peak detector) can be replaced by a peak value unit, and this can be of the analogue or digital type. For peak value forming, no information is required about the size of the area, i.e. the connection point 23 is omitted. For an analogue signal, the memory circuit can consist of, for instance, an RC circuit with a very long time constant, and in the digital case, there are many different types of memories. Said signal-processing and indicating units can also contain non-linear circuits which, for instance for a picture generating unit in the form of an IR camera, converts the value obtained into temperature. The digital presentation of the result obtained can be replaced by analogue presentation, and then, for instance, analogue presentation on the picture screen in connection with the picture, which is shown in FIGS. 6 and 7.

Figure 6:
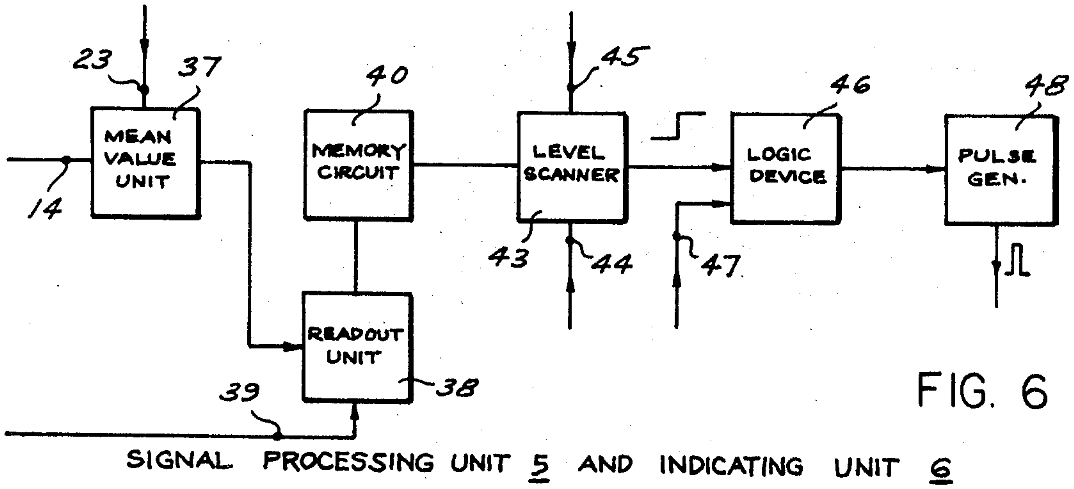
FIG. 6 shows schematically an embodiment for analogue presentation on the picture screen in connection with the picture of an IR camera.

FIG. 6 shows a mean value unit designated 37 which receives information about the size of the area via line 23 and about the video signal voltage within the area via line 14. The result obtained in the mean value unit is fed into a memory circuit 40 via a readout unit 38 for a readout signal via line 39. A result stored in the memory circuit can be fed to a level scanning device 43 which scans the horizontal sweep voltage via 44, and which is moreover provided with a measuring area selector (not shown) via 45. The level scanning device transmits an impulse when the horizontal sweep voltage reaches a level that corresponds to the result in question stored in the memory, provided that the measuring area selector is properly set. The impulse is fed to a logic device 46 (coincidence circuits) which via line 47 also receives information about the vertical scanning position, which in the present case is necessary for indicating the vertical position from a horizontal sweep line coacting with a scale in relation to the picture obtained on the picture screen, which horizontal sweep line and scale are intended for the analogue presentation. The logic device initiates a pulse generator 48 to transmit a pulse that actuates the intensity or the vertical deflection in the picture tube so that an indication corresponding to the value of the result stored in the memory is obtained along said horizontal sweep line.

Figure 7:
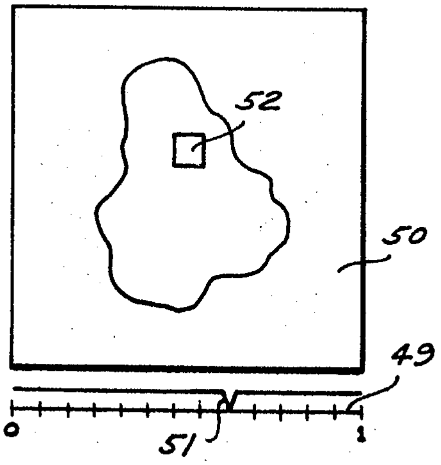
FIG. 7 shows in a vertical view the radiant intensity within a check-formed area indicated on a scale arranged at the picture.

As indicated in FIG. 7, the positions of said scale and horizontal sweep line 49 can be horizontal and located under the area on the picture screen used for the actual picture 50. The scale coacting with the measuring range selector is graduated from 0 to 1 in the example of the embodiment, and an indication 51 caused by the pulse from the pulse generator (48 in FIG. 6) gives an indication through its position on said scale of the magnitude of the measured value of the voltage (the radiation, the temperature etc.) within the area 52.

The equipment described above can advantageously be complemented or duplicated so that two or more movable areas are obtained which an be placed in the field of view, dependent or independent of each other. The circuits in the signal-processing unit, as well as the indicating unit, can then be made so that a memory circuit is obtained for each area. The value for each area can be presented separately, or so that the values from the various memory circuits are compared, subtracted or added before the presentation, which can easily be achieved through the introduction of a further signal-processing device. For IR cameras, it is particularly interesting to have two areas, one of which is placed above a reference member in the field of view and the other on the measuring point desired, whereby in a simple way, through having a knowledge of the temperature of the reference member, the absolute temperature of the measuring point can be obtained. The number of areas utilized in the field of view is limited upwards only by what is useful in practice. In the same way, the areas can coact with switching devices for rapid connection and disconnection of areas. The areas can be made variable or can be given a predetermined configuration.

The invention is not limited to the embodiments shown above as examples, but can be subject to modifications within the scope of the following claims.

I claim:

1. In combination with a scanning camera which generates scanning signals for controlling the scanning of a viewing field and generates information signals related to the amplitude of the radiation at points within the viewing field, apparatus for displaying at least a selected area of the viewing field and giving an indication of the amplitude of the radiation in the selected area of the viewing field comprising a scanning type display device which is driven to scan by said scanning signals and displays representations of said information signals, controllable selective means receiving said scanning signals and generating selection signals occurring at particular times after the start of said scanning signals related to a particular area of the viewing field, means for adding said selection signals to the information signals fed to said display device whereby said particular area is demarcated in the displayed viewing field, measuring means utilizing said selection signals and said information signals for measuring the amplitude of the radiation in said particular area, and measure display means for displaying a representation of the measure of the amplitude of the radiation in said particular area.

2. The apparatus of claim 1 wherein said selective means includes manually operable means for controllably selecting the particular times when the selection signals occur.

3. The apparatus of claim 1 wherein said scanning signals are trigger pulses and said manually operable means includes delay means for delaying the transmission of said trigger pulses and means connected to said delay means and responsive to said trigger pulses for generating said selection signals.

4. The apparatus of claim 1 wherein said scanning signals have ramp waveforms and said manually operable means includes level sensitive means operable when the scanning signals obtain a given amplitude and means connected to said level sensitive means for generating said selection signals.

5. The apparatus of claim 1 wherein said selective means includes manually operable means for controllably selecting the duration of said selection signals.

6. The apparatus of claim 1 wherein said measuring means includes means for measuring the average amplitude of the radiation in said particular area.

7. The apparatus of claim 1 wherein said measuring means includes means for measuring the peak amplitude of the radiation in said particular area.

8. The apparatus of claim 1 wherein said selection signals change the intensity of the display of the entire particular area.

9. The apparatus of claim 7 further comprising means for modifying the selection signals so that the intensity of at least portions of the periphery of the particular area are changed.

10. The apparatus of claim 1 wherein the radiation is thermal radiation and the information signals represent temperature.

11. The apparatus of claim 1 wherein said measure display means includes means for digitally displaying said representation.

12. The apparatus of claim 1 wherein said measure display means includes means for analog displaying said representation.

* * * * *